(12) United States Patent
Shi et al.

(10) Patent No.: US 12,108,270 B2
(45) Date of Patent: Oct. 1, 2024

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventors: Zhihua Shi, Guangdong (CN); Wenhong Chen, Guangdong (CN); Yun Fang, Guangdong (CN); Yingpei Huang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 539 days.

(21) Appl. No.: 17/394,866

(22) Filed: Aug. 5, 2021

(65) Prior Publication Data

US 2021/0368377 A1    Nov. 25, 2021

Related U.S. Application Data

(63) Continuation of application No. PCT/CN2019/075292, filed on Feb. 15, 2019.

(51) Int. Cl.
| | |
|---|---|
| *H04W 24/10* | (2009.01) |
| *H04B 17/318* | (2015.01) |
| *H04B 17/336* | (2015.01) |
| *H04L 5/00* | (2006.01) |
| *H04W 80/02* | (2009.01) |

(52) U.S. Cl.
CPC .......... *H04W 24/10* (2013.01); *H04B 17/318* (2015.01); *H04B 17/336* (2015.01); *H04L 5/0051* (2013.01); *H04W 80/02* (2013.01)

(58) Field of Classification Search
None
See application file for complete search history.

(56) References Cited

U.S. PATENT DOCUMENTS

2020/0112420 A1* 4/2020 Xu ................. H04L 5/0073

FOREIGN PATENT DOCUMENTS

| CN | 104254102 A | 12/2014 |
|---|---|---|
| CN | 104684018 A | 6/2015 |
| CN | 104767586 A | 7/2015 |

(Continued)

OTHER PUBLICATIONS

International Search Report (ISR) dated Oct. 30, 2019 for Application No. PCT/CN2019/075292.

(Continued)

*Primary Examiner* — Kouroush Mohebbi
(74) *Attorney, Agent, or Firm* — Ladas & Parry LLP

(57) ABSTRACT

Embodiments of the present disclosure relate to a wireless communication method, a terminal device and a network device, the method includes: a terminal device receives configuration information transmitted by a network device, the configuration information including a reporting configuration of the terminal device; the terminal device reports a first result to the network device according to the reporting configuration. The wireless communication method, the terminal device and the network device of the embodiments of the present disclosure can realize measurement reporting from the terminal device to the network device.

16 Claims, 7 Drawing Sheets

(56) References Cited

FOREIGN PATENT DOCUMENTS

| CN | 109088683 | A | | 12/2018 | |
|---|---|---|---|---|---|
| CN | 109151885 | A | | 1/2019 | |
| CN | 109219970 | A | * | 1/2019 | ............ H04J 11/005 |
| EP | 3567759 | A1 | | 11/2019 | |
| WO | 2017183866 | A1 | | 10/2017 | |
| WO | 2018128297 | A1 | | 7/2018 | |
| WO | 2019032779 | A1 | | 2/2019 | |

OTHER PUBLICATIONS

Huawei, HiSilicon:"UE-to-UE measurement for cross-link interference mitigation",3GPP TSG RAN WG1 Meeting NR#3,R1-1715422 Sep. 21, 2017(Sep. 21, 2017).

The EESR of corresponding European application No. 19915486.5. dated Dec. 21, 2021.

Huawei et al: "UE-to-UE measurement for cross-link interference mitigation", 3GPP Draft; R1-1801798, 3rd Generation Partnership Project (3GPP), Mobile Competence Centre; 650, Route Des Lucioles; F-06921 Sophia-Antipolis Cedex; France, vol. RAN WG1, no. Athens, Greece; Feb. 26, 2018-Mar. 2, 2018 Feb. 17, 2018(Feb. 17, 2018).

The second Office Action of corresponding Chinese application No. 202110818543.4, dated Jun. 22, 2022.

The EESR of corresponding European application No. 22217069.8. dated Feb. 8, 2023.

The first Office Action of corresponding Chinese application No. 202110818543.4, dated Mar. 30, 2022.

Written Opinion of the International Searching Authority dated Oct. 23, 2019 for Application No. PCT/CN2019/075292.

Huawei"R1-1715422 : UE-to-UE measurement for cross-link interferences mitigation", published on Sep. 11, 2017.

* cited by examiner

WIRELESS COMMUNICATION METHOD, TERMINAL DEVICE AND NETWORK DEVICE

CROSS-REFERENCE TO RELATED APPLICATIONS

This application is a continuation of International Application No. PCT/CN2019/075292, filed on Feb. 15, 2019, the disclosure of which is hereby incorporated by reference in its entirety.

TECHNICAL FIELD

This disclosure relates to the field of communications and in particular, to a wireless communication method, a terminal device and a network device.

BACKGROUND

A new radio (new radio, NR) system has a higher requirement for communication quality, however, a terminal device is usually subject to interference from other communication devices during communication, resulting in a decrease in communication quality. For example, while a terminal device is performing downlink communication, another terminal device in a neighboring cell may be performing uplink communication, and the terminal device that is performing downlink communication may be subject to interference by an uplink signal transmitted by the terminal device that is performing uplink communication.

In order to control the interference generated by other communication devices, the terminal device needs to measure the interference and report the measurement result to the network. Therefore, how the terminal device reports the measurement result to the network device is an urgent problem to be solved.

SUMMARY

Embodiments of the present disclosure provide a wireless communication method, a terminal device and a network device, which can realize measurement reporting by the terminal device to the network device.

In a first aspect, a wireless communication method is provided, which includes: receiving, by a terminal device, configuration information transmitted by a network device, the configuration information including a reporting configuration of the terminal device; and reporting, by the terminal device, a first result to the network device according to the reporting configuration.

In a second aspect, a wireless communication method is provided, which includes: transmitting, by a network device, configuration information to a terminal device, the configuration information including a reporting configuration of the terminal device; and receiving, by the network device, a first result reported by the terminal device.

In a third aspect, a terminal device is provided, which is configured to execute the method in the abovementioned first aspect or various implementations thereof.

Specifically, the terminal device includes a functional module for executing the method in the abovementioned first aspect or various implementations thereof.

In a fourth aspect, a network device is provided, which is configured to execute the method in the abovementioned second aspect or various implementations thereof.

Specifically, the network device includes a functional module for executing the method in the abovementioned second aspect or various implementations thereof.

In a fifth aspect, a terminal device is provided, including a processor and a memory. The memory is configured to store a computer program, and the processor is configured to call and run the computer program stored in the memory to execute the method in the abovementioned first aspect or various implementations thereof.

In a sixth aspect, a network device is provided, including a processor and a memory. The processor is configured to call and run the computer program stored in the memory to execute the method in the abovementioned second aspect or various implementations thereof.

In a seventh aspect, a chip is provided, which is configured to implement the method in any one of the abovementioned first aspect to second aspect or various implementations thereof.

Specifically, the chip includes: a processor, configured to call and run a computer program from a memory to enable a device installed with the chip to execute the method in any one of the abovementioned first aspect to the second aspect or various implementations thereof.

In an eighth aspect, a computer readable storage medium is provided, which is configured to store a computer program, where the computer program enables a computer to perform the method in any one of the abovementioned first aspect to the second aspect or various implementations thereof.

In a ninth aspect, a computer program product is provided, which includes computer program instructions, where the computer program instructions enable a computer to perform the method in any one of the abovementioned first aspect to the second aspect or various implementations thereof.

In a tenth aspect, a computer program is provided, which when running on a computer, enables a computer to perform the method in any one of the abovementioned first aspect to the second aspect or various implementations thereof.

With the abovementioned technical solutions, the terminal device receives the configuration information transmitted by the network device, where the configuration information includes the reporting configuration of the terminal device, and after the terminal device performs interference measurement and obtains the measurement result, it can report the first result to the network device according to the reporting configuration, and thus, the measurement reporting of the terminal device can be realized.

DESCRIPTION OF EMBODIMENTS

Technical solutions of embodiments of the present disclosure will be described below in combination with accompanying drawings of the embodiments of the present disclosure. Obviously, the described embodiments are part, rather than all, of the present disclosure. Based on the embodiments of the present disclosure, all other embodiments obtained by those skilled in the art without any creative effort shall fall within the protection scope of the present disclosure.

Embodiments of the present disclosure can be applied to various communication systems, for example, a global system of mobile communication (Global System of Mobile communication, GSM) system, a code division multiple access (Code Division Multiple Access, CDMA) system, a wideband code division multiple access (Wideband Code Division Multiple Access, WCDMA) system, a general packet radio service (General Packet Radio Service, GPRS), a long term evolution (Long Term Evolution, LTE) system, an advanced long term evolution (Advanced long term evolution, LTE-A) system, a new radio (New Radio, NR) system, an evolution system of NR system, an LTE-based access to unlicensed spectrum (LTE-based access to unlicensed spectrum, LTE-U) system, an NR-based access to unlicensed spectrum (NR-based access to unlicensed spectrum, NR-U) system, a universal mobile telecommunication system (Universal Mobile Telecommunication System, UMTS), Wireless Local Area Networks (Wireless Local Area Networks, WLAN), Wireless Fidelity (Wireless Fidelity, WiFi), next-generation communication systems or other communication systems, etc.

Generally speaking, traditional communication systems support a limited number of connections and are easy to realize. However, with the development of communication technology, mobile communication systems will not only support traditional communications, but will also support, for example, Device to Device (Device to Device, D2D) communication, machine to machine (Machine to Machine, M2M) communication, machine type communication (Machine Type Communication, MTC), and vehicle to vehicle (Vehicle to Vehicle, V2V) communication, etc. The embodiments of the present disclosure may also be applied to these communications systems.

Optionally, the communication system in the embodiments of the present disclosure may be applied to a carrier aggregation (Carrier Aggregation, CA) scenario, can also be applied to a dual connectivity (Dual Connectivity, DC) scenario, and may also be applied to a standalone (Standalone, SA) deployment network scenario.

Figure 1:
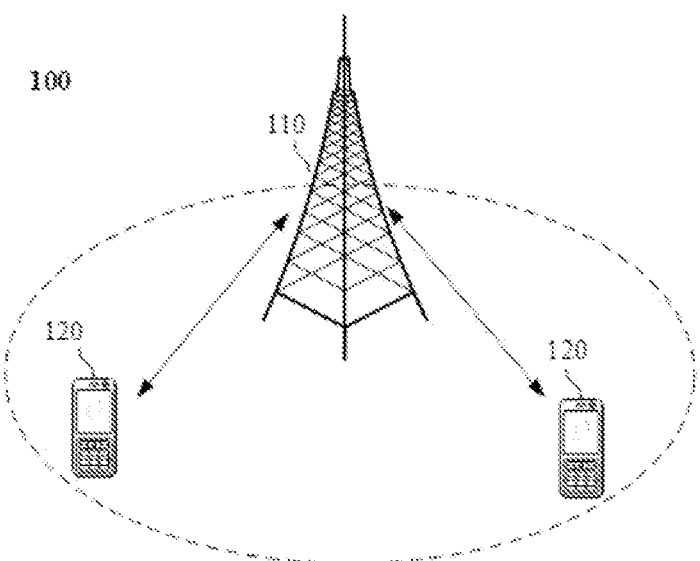
FIG. 1 is a schematic diagram of a communication system architecture according to an embodiment of the present disclosure.

Illustratively, a communication system 100 applied in the embodiments of the present disclosure is as shown in FIG. 1. The communication system 100 may include a network device 110, and the network device 110 may be a device that communicates with a terminal device 120 (or referred to as a communication terminal, a terminal). The network device 110 may provide communication coverage for a specific geographic area, and may communicate with terminal devices located within the coverage area. Optionally, the network device 110 may be a base station (Base Transceiver Station, BTS) in a GSM system or CDMA system, or a base station (NodeB, NB) in a WCDMA system, or an evolutional base station (Evolutional Node B, eNB or eNodeB) in an LTE system, or a wireless controller in a cloud radio access network (Cloud Radio Access Network, CRAN); or, the network device may be a mobile switching center, a relay station, an access point, an vehicle device, a wearable device, a concentrator, a switch, a network bridge, a router, a network-side device in a 5G network, or a network device in a public land mobile network (Public Land Mobile Network, PLMN) evolved in the future or the like.

The communication system 100 also includes at least one terminal device 120 located within a coverage area of the network device 110. The "terminal device" used herein includes, but isn't limited to be connected via a wireline, such as via public switched telephone networks (Public Switched Telephone Networks, PSTN), a digital subscriber line (Digital Subscriber Line, DSL), a digital cable, a direct cable; and/or, another data connection/network; and/or, via a wireless interface, for example, for a cellular network, a wireless local area network (Wireless Local Area Network, WLAN), a digital television network such as a DVB-H network, a satellite network, an AM-FM radio transmitter; and/or, an apparatus configured to receive/transmit communication signals of another terminal device; and/or, an Internet of Things (Internet of Things, IoT) device. A terminal device configured to communicate via a wireless interface may be referred to as a "wireless communication terminal", "wireless terminal", or "mobile terminal". Examples of mobile terminals include, but are not limited to, satellite or cellular phones; personal communications system (Personal Communications System, PCS) terminals that may combine cellular radio telephone with data processing, fax and data communication capabilities; PDAs that may include a radio telephone, a pager, an Internet/Intranet access, a Web browser, a notepad, a calendar, and/or a receiver of a global positioning system (Global Positioning System, GPS); and conventional lap-top and/or handheld receivers or other electronic apparatuses including radio telephone transceiver. Terminal device may refer to an access terminal, a user equipment (User Equipment, UE), a user unit, a user station, a mobile station, a mobile platform, a remote station, a remote terminal, a mobile device, a user terminal, a terminal, a wireless communication device, a user agent, or a user apparatus. The access terminal may be a cellular phone, a cordless phone, a session initiation protocol (Session Initiation Protocol, SIP) phone, a wireless local loop (Wireless Local Loop, WLL) station, a personal digital processing (Personal Digital Assistant, PDA), a handheld or computing device with function of wireless communication, or other processing devices connecting to a wireless modem, a vehicle device, a wearable device, a terminal device in a 5G network, or a terminal device in a PLMN evolved in the future.

Optionally, the terminal devices 120 may communicate with each other via D2D communication.

FIG. 1 illustratively shows one network device and two terminal devices. Optionally, the communication system 100 may include multiple network devices, and there may be other number of terminal devices within the coverage area of each network device, which is not limited in the embodiments of the present disclosure.

Optionally, the communication system 100 may also include other network entities, such as a network controller, a mobility management entity, or the like, which is not limited in the embodiments of the present disclosure.

It should be understood that in the embodiments of the present disclosure, a device with a communication function in the network/system may be referred to as a communication device. By taking the communication system 100 shown in FIG. 1 as an example, the communication device may include the network device 110 and the terminal device 120 that have a communication function, and the network device 110 and the terminal device 120 may be specific devices described above, which will not be repeatedly described herein. The communication device may also include other devices, for example, other network entities such as a network controller, a mobility management entity, located in the communication system 100, which is not limited in the embodiments of the present disclosure.

It should be understood that, the terms "system" and "network" are often used interchangeably herein. The term "and/or" herein is simply a description of an association relationship of associated objects, and indicates that there may be three association relationships, for example, A and/or B may indicate three cases: A alone, both A and B, and B alone. In addition, the character "/" herein generally indicates that the associated objects before and after the character is in an "or" relationship.

Different services or applications (Application, APP) of terminal devices may have different requirements on the uplink data rate and the downlink data rate. For example, when watching a movie on a mobile phone, the downlink data rate is generally higher than the uplink data rate. On the contrary, the uplink data rate of some services/APPs may be higher than the downlink data rate, for example, when local data is backed up to the cloud, the uplink data rate is higher than the downlink data rate. For the same service/APP, different operations may also have different requirements on the uplink and downlink data rates, for example, the uplink data rate may be higher than the downlink data rate when a video is uploaded for sharing, while the downlink data rate may be higher than the uplink data rate when a video shared by a friend is watched.

Based on the above-mentioned actual service/APP situations, if the radio network maintains fixed or semi-static uplink and downlink resource allocation (for example, the fixed uplink and downlink time slot configuration in an LTE/NR system), then it may not be possible to optimally match the service transmission in a short time, resulting in inefficient use of resources and the problem that the experience of the terminal device cannot be further improved.

In order to solve the above problems, a method of dynamically adjusting the uplink and downlink transmission directions (transmission resources) can be adopted. For example, when the amount of downlink data of a current cell or a terminal device increases, the network device can allocate more resources for downlink transmission (for example, more time slots are used for downlink transmission).

The NR system proposes a flexible time slot format, where the time slot format includes information about how many downlink symbols, flexible symbols, and uplink symbols are included in a time slot.

The configuration of some time slot formats supported in the current NR protocol can be shown in Table 1. In Table 1, a row represents a time slot, it can be seen that there are 14 symbols in each time slot. In Table 1, "D" represents a downlink symbol, "U" represents an uplink symbol, and "F" represents a flexible symbol. It can be seen that slot format 0 represents that all 14 symbols in a slot are downlink symbols, slot format 1 represents that all 14 symbols in a slot are uplink symbols, and slot format 20 represents the first two symbols of a slot are configured as downlink symbols, the last symbol is configured as an uplink symbol, and the 11 symbols in the middle are configured as flexible symbols.

TABLE 1

| Time slot format | Symbol number of time slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |

If a cell changes the time slot format relatively dynamically, or a network device changes the time slot format corresponding to a certain one or some terminal devices, additional interference may be caused (compared to a static uplink and downlink configuration).

Figure 2:
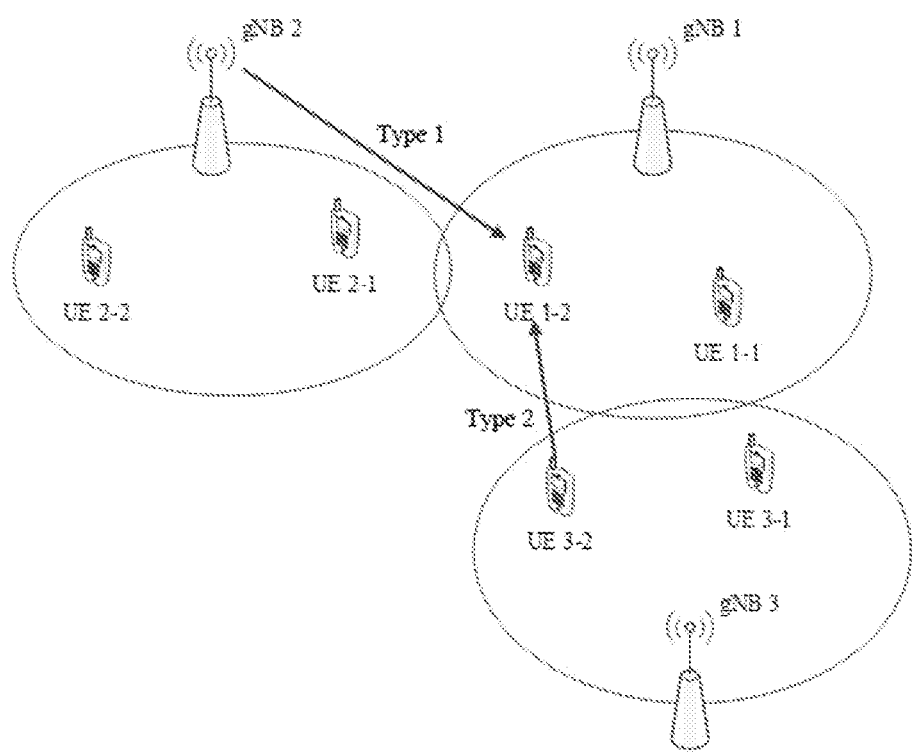
FIG. 2 is a schematic diagram of downlink reception interference of a terminal device according to an embodiment of the present disclosure.

FIG. 2 is taken as an example for illustration. If neighboring cells all adopt the same uplink and downlink configuration, when UE 1-2 receives a downlink signal, other cells are also performing downlink signal transmission (if there is transmission), and there will be no uplink signal transmission, therefore, UE 1-2 may only be interfered by signals transmitted by other base stations (for example, type 1 interference in the figure).

If relatively dynamic uplink and downlink configuration is supported, for example, a current service of UE 3-2 is mainly to upload a large amount of data, then base station 3 may configure more uplink resources (for example, more time slots are configured as full uplink, or more symbols in some time slots are configured as uplink) for the transmission of UE 3-2. Then, if the uplink and downlink transmissions of UE 1-2 and UE 3-2 are different, additional interference may be formed, such as the type 2 interference shown in the figure, that is, when UE 1-2 receives downlink data transmission, it may be interfered by the uplink signal transmitted by nearby UE 3-2.

In addition, if the time slot format does not change, type 2 interference may also occur. For example, all symbols in a time slot are flexible symbols (for example, time slot format 2 in Table 1), gNB1 may use this time slot for downlink transmission of UE 1-2, and gNB3 may use this time slot for uplink transmission of UE 3-2. At this time, the above-mentioned type 2 interference will also occur.

Therefore, in order to ensure the performance of the system or terminal device, it is necessary to measure the interference of the terminal device and report the measurement result. In view of this, an embodiment of the present disclosure proposes a wireless communication method.

Figure 3:
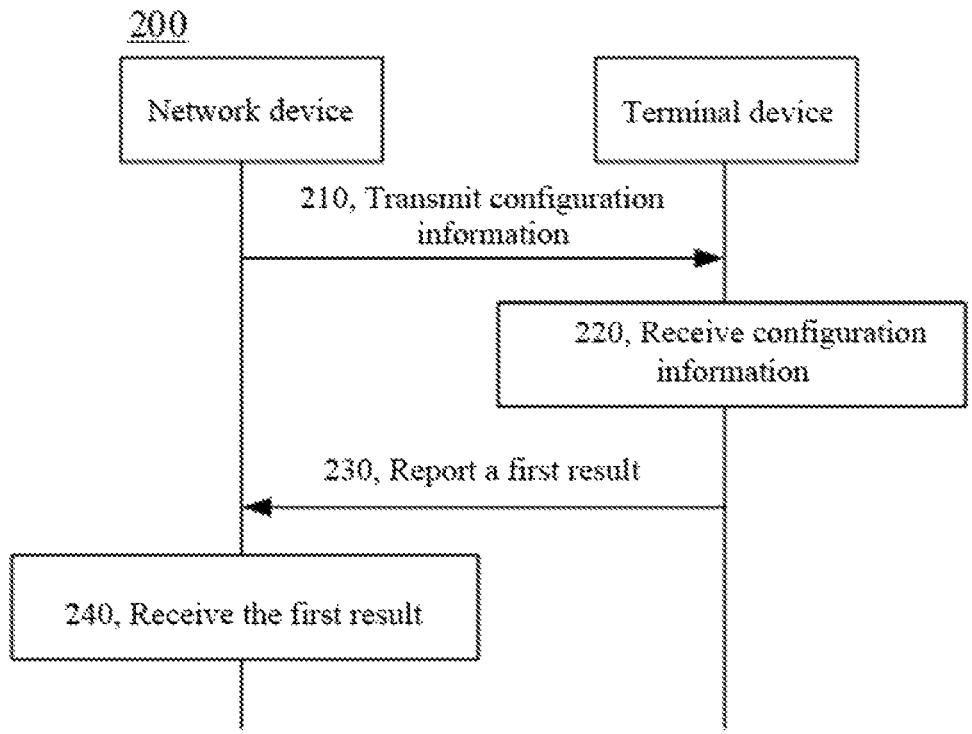
FIG. 3 is a schematic flowchart of a wireless communication method according to an embodiment of the present disclosure.

FIG. 3 is a schematic flowchart of a wireless communication method 200 according to an embodiment of the present disclosure. The method 200 may include at least part content of the following content.

In 210, a network device transmits configuration information to a terminal device, and the configuration information includes a reporting configuration of the terminal device.

In 220, the terminal device receives the configuration information transmitted by the network device.

In 230, the terminal device reports a first result to the network device.

In 240, the network device receives the first result reported by the terminal device.

It should be understood that the method of the embodiment of the present disclosure can be applied to cross-link interference (Cross-Link Interference, CLI) measurement. For example, CLI may be interference caused by the uplink transmission of at least one terminal device to the downlink reception of a neighboring terminal device, such as type 2 interference in FIG. 2. It should be understood that the CLI measurement does not limited to between terminals only, but may also be used in other similar situations, such as between network devices.

In addition, the method of the embodiments of the present disclosure may also be applied to other scenarios, such as interference from other network devices to the terminal device, interference between neighboring cells, or, type 1 interference mentioned in the above content, and the like.

It should be understood that the embodiment of the present disclosure will take CLI measurement performed by the terminal device as an example for illustration, but the present disclosure is not limited to this.

Optionally, a reporting mechanism for the terminal device to report the first result may be periodical reporting and/or event-triggered reporting. If the reporting mechanism is the periodical reporting and the event-triggered reporting, the network device may configure the reporting mechanism of the terminal device through a corresponding information element (Information Element, IE).

For the convenience of description, the configuration information in FIG. 3 is referred to as first configuration information, where the first configuration information may be carried in radio resource control (Radio Resource Control, RRC) signaling, or may be carried in media access control (Media Access Control, MAC) control element (Control Element, CE) signaling.

Optionally, the first configuration information may also include a measurement configuration, where the measurement configuration may include, but is not limited to, a measurement object configuration and a cell list.

In an embodiment of the present disclosure, as an example, a configuration domain where the first configuration information is located may be the same as the configuration domain of the configuration information used for mobility measurement (referred to as second configuration information for convenience of description). That is, the configuration domain for the second configuration information is included in an information element (information element, IE), and the configuration domain also indicates the first configuration information. In this way, no additional IE is required, and standardization work can be reduced.

In this example, the configuration in the first configuration information may be different from the configuration in the second configuration information. For example, the second configuration information includes a reporting interval, a reporting amount, a maximum number of reported cells, and a reporting quantity, and one or more configurations in the second configuration may be set as optional. For example, only the reporting interval is included in the first configuration information, and the reporting amount, the maximum number of reported cells, and the reporting quantity are not configured. For another example, in the first configuration information, an event different from that in the second configuration information may be added, such as A3 event.

For example, as shown in the following code, three types of reporting (periodical, eventTriggered, reportCGI) can be configured in ReportConfigNR (i.e., IE):

```
ReportConfigNR ::=        SEQUENCE {
  reportType                CHOICE {
    periodical                PeriodicalReportConfig
    eventTriggered            EventTriggerConfig
    reportCGI                 ReportCGI
  }
}
```

Where the PeriodicalReportConfig is the periodical reporting configuration, and the EventTriggerConfig is the event-triggered reporting configuration.

If it is the periodical reporting, the configuration in the second configuration information may be as follows:

```
PeriodicalReportConfig ::=    SEQUENCE {
  rsType                        NR-RS-Type,
  reportInterval                ReportInterval,
  reportAmount                  ENUMERATED {r1, r2, r4, r8,
r16, r32, r64, infinity},
  reportQuantityCell            MeasReportQuantity,
  maxReportCells                INTEGER (1..maxCellReport),
  reportQuantityRS-Indexes      MeasReportQuantity
  OPTIONAL, -- Need R
  maxNrofRS-IndexesToReport     INTEGER
(1..maxNrofIndexesToReport)
  OPTIONAL, -- Need R
  includeBeamMeasurements       BOOLEAN,
  useWhiteCellList              BOOLEAN,
}
```

When configuring the first configuration information, the network device may change one or more of mandatory fields in the second configuration information to be optional, and in this way, when configuring the reporting for CLI measurement, some optional items may not be configured. The following is to set all possible fields as optional. Optionally, it is possible to set only part fields of the modified fields in the following example as optional.

```
PeriodicalReportConfig ::=            SEQUENCE {
    rsType                                NR-RS-Type, (Modification:
optional)
    reportInterval                        ReportInterval,
    reportAmount                          ENUMERATED {r1, r2, r4, r8, r16,
r32, r64, infinity}, (Modification: optional)
    reportQuantityCell                    MeasReportQuantity,
(Modification: optional)
    maxReportCells                        INTEGER (1..maxCellReport),
(Modification: optional)
    reportQuantityRS-Indexes              MeasReportQuantity
OPTIONAL, -- Need R
    maxNrofRS-IndexesToReport             INTEGER
(1..maxNrofIndexesToReport)
OPTIONAL, -- Need R
    includeBeamMeasurements               BOOLEAN, (Modification:
optional)
    useWhiteCellList                      BOOLEAN, (Modification:
optional)
}
```

If it is the event-triggered reporting, the configuration in the second configuration information is as follows:

```
EventTriggerConfig::=                 SEQUENCE {
    eventId                               CHOICE {
        eventA1                               Related configuration information;
        },
    },
    rsType                                NR-RS-Type,
    reportInterval                        ReportInterval,
    reportAmount                          ENUMERATED {r1, r2, r4, r8, r16,
r32, r64, infinity},
    reportQuantityCell                    MeasReportQuantity,
    maxReportCells                        INTEGER (1..maxCellReport),
    reportQuantityRS-Indexes              MeasReportQuantity
OPTIONAL, -- Need R
    maxNrofRS-IndexesToReport             INTEGER
(1..maxNrofIndexesToReport)
OPTIONAL, -- Need R
    includeBeamMeasurements               BOOLEAN,
    reportAddNeighMeas                    ENUMERATED {setup}
OPTIONAL, -- Need R
}
```

When the network device configures the first configuration information, the content is modified on the basis of the second configuration information as follows:

A. One or more of the mandatory fields in the second configuration information is changed to be optional, and in this way, when configuring the reporting for CLI measurement, optional items may not be configured. The following code sets all possible fields as optional.

B. Adding one or more new events (evenNew), the following code only shows the addition of one new event.

```
EventTriggerConfig::=                 SEQUENCE {
    eventId                               CHOICE {
        eventA1                               Related configuration information;
        },
        eventNew                              Related configuration information;
(Modification: add configuration information for new event)
        },
    rsType                                NR-RS-Type, (Modification:
optional)
    reportInterval                        ReportInterval,
    reportAmount                          ENUMERATED {r1, r2, r4, r8, r16,
r32, r64, infinity}, (Modification: optional)
    reportQuantityCell                    MeasReportQuantity, (Modification:
optional)
    maxReportCells                        INTEGER (1..maxCellReport),
(Modification: optional)
    reportQuantityRS-Indexes              MeasReportQuantity
OPTIONAL, -- Need R
    maxNrofRS-IndexesToReport             INTEGER
```

```
(1..maxNrofindexesToReport) OPTIONAL,         -- Need R
    includeBeamMeasurements                   BOOLEAN,
(Modification: optional)
    reportAddNeighMeas                        ENUMERATED {setup}
OPTIONAL, -- Need R
}
```

As another example, the configuration domain where the first configuration information is located may be different from the configuration domain where the second configuration information is located, but they are in the same IE. That is, the first configuration domain and the second configuration domain may be included in one IE, where the first configuration domain indicates the second configuration information, and the second configuration domain indicates the first configuration information.

In this example, the configuration in the first configuration information and the configuration in the second configuration information may be the same, or may also be different, which is not specifically limited in the embodiment of the present disclosure.

In addition, the embodiment of the present disclosure does not limit the location of the second configuration domain in the IE. For example, the second configuration domain may be set in the last configuration domain in the IE, or may be set in the first configuration domain in the IE.

Illustratively, a certain IE includes three configuration domains, where the second configuration information is in one of the three configuration domains. The network device may add one or more configuration domains to the IE, and the added configuration domain may indicate periodical reporting configuration, and in addition, may also indicate event-triggered reporting configuration, where the first configuration information is indicated in one of the added configuration domains.

For example, as shown in the following code, three types of reporting (periodical, eventTriggered, reportCGI) can be configured in ReportConfigNR (i.e., IE):

```
ReportConfigNR ::=      SEQUENCE {
    reportType          CHOICE {
        periodical          PeriodicalReportConfig
        eventTriggered      EventTriggerConfig
```

```
-continued reportCGI           ReportCGI
    }
}
```

If it is the periodical reporting, the network device may add at least one reporting type to the above IE, that is, PeriodicalReportConfig_CL. The network may configure one of four or more reporting types in ReportConfigNR. The modified IE is as follows (where the location of the newly added field can be changed, and the specific name of variable and name of variable type can be changed; the added reportType type may have other types besides PeriodicalReportConfig_CL, such as defining a new event trigger). Where the configuration information in PeriodicalReportConfig_CL includes at least: a reporting interval, or, it may also include the number of times the terminal device reports the first result.

```
ReportConfigNR ::=          SEQUENCE {
    reportType              CHOICE {
        periodical              PeriodicalReportConfig,
        eventTriggered          EventTriggerConfig,
        reportCGI               ReportCGI
        periodical2             PeriodicalReportConfig_CL
(Modification)
    }
}
PeriodicalReportConfig_CL   :: = SEQUENCE {
    reportInterval                      ReportInterval,
}
```

If it is the event-triggered reporting, the network device can add at least one reporting type to the above IE, that is, EventTriggerConfig_CL. The network can configure one of four or more reporting types in ReportConfigNR. The modified IE is as follows (where the location of the newly added field can be changed, and the specific name of variable and name of variable type can be changed; the added reportType type can have other types besides EventTriggerConfig_CL), where the configuration information in EventTriggerConfig_CL includes at least: a reporting interval and a trigger condition, or, may also include the number of times the terminal device reports the first result.

```
ReportConfigNR ::=      SEQUENCE {
    reportType          CHOICE {
        periodical          PeriodicalReportConfig,
        eventTriggered      EventTriggerConfig,
        reportCGI           ReportCGI
```

| | |
|---|---|
| eventTriggered 2 (Modification) } } } EventTriggerConfig _CL event reportInterval } | EventTriggerConfig _CL ::= EQUENCE { Event configuration information, ReportInterval |

As another example, the IE where the first configuration information is located may be different from the IE where the second configuration information is located. That is, the first IE is different from the second IE, where the first IE includes the first configuration domain, the first configuration domain indicates the second configuration information, the second IE includes the second configuration domain, and the second configuration domain indicates the first configuration information.

After receiving the first configuration information, the terminal device may perform CLI measurement based on the measurement configuration in the first configuration information to obtain at least one first measurement result.

A brief introduction of a measurement quantity or reported value of CLI measurement will be given in the following.

The measurement quantity or reported value of CLI measurement may be in two ways: a sounding reference signal-reference signal received power (SRS-RSRP) and a received signal strength indicator (RSSI).

SRS-RSRP is an SRS-based RSRP, that is, an RSRP obtained by performing measurement on an SRS. The network device may configure the SRS in the first configuration information for SRS-RSRP measurement of the terminal device. The first configuration information may include a measurement object configuration, and the measurement object configuration information may include, but is not limited to, the following information: a time-frequency resource of the SRS measured by the terminal device, a sequence of the SRS, a cyclic shift, and a measurement period.

Regarding RSSI, the first configuration information may include a set of time-frequency resources for the RSSI measurement of the terminal device, where the measurement object configuration information may include a symbol-level instruction and a physical resource block (PRB)-level instruction.

The above two methods can be measurement and reporting based on L3. If the measurement quantity or the reported value is RSRP, the measurement of the terminal device can identify different interference sources, however, the complexity of the measurement is high. If the measurement quantity or the reported value is RSSI, the measurement of the terminal device is simple, but different interference sources cannot be distinguished; or, in order to identify the interference source, the signaling overhead is too large.

It should be understood that, in the method of the embodiment of the present disclosure, in addition to obtaining at least one RSRP when performing measurement on an SRS resource, the terminal device may also obtain at least one reference signal receiving quality (RSRQ) or at least one signal to interference plus noise ratio (SINR), that is, the terminal device may perform measurement on the SRS resource to obtain at least one value of at least one of RSRQ, RSRP, and SINR.

It should also be understood that, in the embodiment of the present disclosure, the terminal device may measure an SRS on an SRS resource, and may also measure other reference signals on the SRS resource, which is not limited in the embodiment of the present disclosure. When the terminal device performs measurement on the SRS resource, the embodiment of the present disclosure takes the terminal device measuring the SRS on the SRS resource to obtain the RSRP as an example for illustration.

In the embodiment of the present disclosure, the terminal device may determine the measurement quantity of CLI measurement in multiple manners, which will be introduced respectively below.

Manner 1: the measurement quantity is indicated in the first configuration information, so that the terminal device can determine the measurement quantity.

Manner 2: the reporting configuration indicates the measurement quantity.

Optionally, the reporting configuration indicating the measurement quantity may be understood as: the reporting configuration explicitly indicates the measurement quantity, or the reporting configuration implicitly indicates the measurement quantity.

Give an example of the reporting configuration explicitly indicating the measurement quantity. If the measurement object configuration includes SRS resource information, the reporting configuration may indicate that RSRP is the measurement quantity; if the measurement object configuration includes first resource information for RSSI measurement, the reporting configuration may indicate that the measurement quantity is RSSI; if the measurement object configuration includes the SRS resource information and the first resource information, the reporting configuration may indicate that the measurement quantity is RSRP and RSSI.

The CLI reporting configuration signaling IE is denoted as ReportConfigCLI. As described in the previous embodiment, it may refer to the modified existing PeriodicalReportConfig, or it may be a new IE PeriodicalReportConfig_CL; it may also refer to the modified existing EventTriggerConfig, or a configuration of a measurement quantity in a new IE EventTriggerConfig_CL.

A possible IE structure is as follows (the name of field and the location of field may be changed):

| | |
|---|---|
| ReportConfigCLI ::= reportQuantity RSSI) May also include other field } | SEQUENCE { Type (the type may be RSRP, |

Another possible IE structure is as follows:

| | |
|---|---|
| ReportConfigCLI ::= reportQuantity | SEQUENCE { MeasReportQuantity |

```
May also include other field
}
MeasReportQuantity ::=          SEQUENCE {
    rsrp                        BOOLEAN,
    rsrq                        BOOLEAN,
    sinr                        BOOLEAN,
    SRS-rsrq                    BOOLEAN,
    RSSI                        BOOLEAN,
}
```

Another possible IE structure is as follows:

```
ReportConfigCLI ::=                             SEQUENCE {
reportQuantity                                  MeasReportQuantity
May also include other field}
MeasReportQuantity ::=                          SEQUENCE {
    rsrp                                        BOOLEAN, description:
RSRP is reused, without introducing a new SRS-RSRP
    rsrq                                        BOOLEAN,
    sinr                                        BOOLEAN,
    RSSI                                        BOOLEAN,
}
```

The reporting configuration implicitly indicating the measurement quantity may include: the reporting configuration indicates a parameter corresponding to the measurement quantity. After the terminal device receives the parameter, the measurement quantity can be determined according to the parameter.

As another example, if the measurement object configuration is included in the first configuration information, the measurement object configuration may explicitly indicate the measurement quantity, that is, the information carried by the measurement object configuration indicates the measurement quantity.

Manner 3: the terminal device determines the measurement quantity according to the measurement object configuration.

As an example, the information carried by the measurement object configuration may indicate the measurement quantity, that is, the measurement object configuration may explicitly indicate the measurement quantity.

As another example, the measurement object configuration may implicitly indicate the measurement quantity. Optionally, the terminal device may determine the measurement quantity according to the measurement signal or measurement resource in the measurement object configuration.

Illustratively, the network device may indicate SRS resource information or first resource information in the measurement object configuration, when a piece of SRS resource information or first resource information is associated with the measurement object, the terminal device may determine the measurement quantity according to the measurement object configuration.

For example, if the measurement object configuration includes the SRS resource information, the corresponding measurement quantity is RSRP. Or, if the measurement object configuration includes the first resource information, the corresponding measurement quantity is RSSI. Or, if the measurement object configuration includes the SRS resource information and/or the first resource information, the corresponding measurement quantity is RSRP and/or RSSI.

The measurement quantity corresponding to the SRS resource information being RSRP can be understood as: RSRP measurement is performed on the SRS resource; the measurement quantity corresponding to the first resource information being RSSI can be understood as: RSSI measurement is performed on the first resource.

If the reporting configuration or the measurement object configuration explicitly indicates the measurement quantity, the signaling design can be clearer, and the terminal device can clearly determine the measurement quantity that needs to be measured. If the measurement object configuration implicitly indicates the measurement quantity, the signaling overhead can be saved.

Further, if the measurement quantity is RSRP, the terminal device can perform RSRP measurement on the SRS resource to obtain the first measurement result; if the measurement quantity is RSSI, the terminal device can perform RSSI measurement on the first resource to obtain the first measurement result; if the measurement quantity is RSRP and RSSI, the terminal device can perform RSRP measurement on the SRS resource and at the same time, perform RSSI measurement on the first resource to obtain the first measurement result.

After performing the CIA measurement to obtain the first measurement result, the terminal device may report the first result to the network device based on the first measurement result and the reporting configuration.

Optionally, the number of first results may be less than or equal to the number of first measurement results. For example, the terminal device performs CLI measurement on five SRS resources to obtain five first measurement results, and the number of first results reported to the network device is three. For another example, the terminal device performs CLI measurement on five SRS resources to obtain five first measurement results, and according to a judgment condition, selects the first results corresponding to three measurement results that meet the condition for reporting, that is, the number of the first results reported is 3.

If the reporting mechanism is periodical reporting, the reporting configuration can include a reporting interval, that is, a reporting period. For example, the reporting interval may be 20 ms, that is, the terminal device reports the first result to the network device every 20 ms.

If the reporting mechanism is event-triggered reporting, the reporting configuration can include a reporting interval and a trigger condition. Illustratively, the trigger condition may include a trigger threshold, for example, the terminal device reports the first result to the network device when the first measurement result meets the trigger threshold, and does not report if the trigger threshold is not met. For another example, the trigger condition may include a preset number of the first measurement result, for example, if the preset number of first measurement result is five, then when the number of first measurement results is greater than or equal to five, the terminal device reports the first result to the network device, and if the number of first measurement results is less than five, it does not report.

The trigger condition may be preset on the terminal device based on a protocol, or transmitted by the network device to the terminal device, that is, the network device may transmit first information to the terminal device, and the first information may include the trigger condition. Optionally, the first information and the first configuration information may be carried in the same signaling.

Optionally, whether for periodical reporting or event-triggered reporting, the reporting configuration may also include the number of first results that the terminal device reports to the network device each time.

For example, the number of first results reported by the terminal device each time included in the reporting configuration is N, and the number of first measurement results is M, where M>N, the terminal device can then select N measurement results from M first measurement results for reporting.

It should be noted that the embodiment of the present disclosure does not limit the implementation in which the terminal device selects N measurement results from M measurement results. For example, the terminal device may randomly select N measurement results among M measurement results, or, the terminal device may select N measurement results obtained first among the M measurement results, or, the terminal device may select N measurement results obtained last among the M measurement results.

If the reporting configuration does not include the number of first results reported by the terminal device each time, the number of the first results reported by the terminal device to the network device each time is 1, or the number of the first results reported may be the same as the number of the first measurement results.

It should be understood that the number of the first results reported by the terminal device at different times may be different or the same. For example, the number of the first results reported by the terminal device last time is 1, and the number of the first results reported this time is 2.

Optionally, whether for the periodical reporting or the event-triggered reporting, the reporting configuration may also include the number of times the terminal device reports the first result to the network device.

For example, if the reporting mechanism is periodical reporting, the reporting interval is 20 ms, and the number of times the terminal device reports the first result included in the reporting configuration is 5, the terminal device can then report the first result to the network device every 20 ms, for a total of 5 times.

If the reporting configuration does not include the number of times the terminal device reports the first result, the number of times the terminal device reports the first result may be a default value. For example, the default value may be 1, or infinity. For example, if the default value is infinity, the reporting mechanism is periodical reporting, and the reporting interval is 2 ms, the terminal device will report the first result to the network device every 2 ms. For another example, if the default value is infinity and the reporting mechanism is event-triggered reporting, as long as the first measurement satisfies the trigger condition, the terminal device will report the first result to the network device.

As the periodical reporting, if the reporting interval is 2 ms, the terminal device may report the first result to the network device based on the first measurement result every 2 ms.

As the event-triggering reporting, the terminal device reports the first result to the network device according to at least one first measurement result and the reporting mechanism, which may include: if the first measurement result meets the trigger condition, the terminal device reports the first result to the network device.

When the trigger condition includes the trigger threshold, as an example, if any measurement result in the first measurement result meets the trigger threshold, the terminal device may report the first result to the network device. At this time, the terminal device may perform CLI measurement on one resource or multiple resources.

For example, the first measurement result includes a measurement result 1, a measurement result 2, and a measurement result 3, and the measurement result 1 meets the trigger threshold, and then, the terminal device may report the first result to the network device, where the first result may include at least one of the measurement result 1, the measurement result 2, and the measurement result 3.

As another example, if the number of first measurement results that meet the trigger threshold is greater than or equal to a predetermined value, then the terminal device may report the first result to the network device. At this time, the terminal device may perform CLI measurement on one resource or multiple resources.

For example, the first measurement result includes a measurement result 1, a measurement result 2, and a measurement result 3, and the predetermined value is 3, and then the terminal device can report the first result only when the three measurement results all meet the trigger threshold. At this time, the first result may include at least one of the measurement result 1, the measurement result 2, and the measurement result 3. If only one or two of the three measurement results meet the trigger threshold, the terminal device does not report the first result.

The predetermined value may be preset on the terminal device based on a protocol, or, may be transmitted by the network device to the terminal device, that is, the network device may transmit second information to the terminal device, where the second information may include the predetermined value. Optionally, the second information and the first configuration information are included in the same signaling.

Further, a parameter delta may be added to calculate a judgment condition for entering an event and/or leaving an event. When determining whether to enter an event, the parameter delta is additionally considered on the basis of other parameters; and/or, when determining whether to leave the event, the parameter delta is additionally considered on the basis of other parameters.

In a possible embodiment, a first result reported by the terminal device may be some or all of first measurement results. For example, the terminal device performs RSRP measurement on an SRS resource and obtains that the first measurement result, i.e., the RSRP value, is −130 dB, then the terminal device can report −130 dB to the network device, that is, the first result is −130 dB.

Optionally, the first measurement result may be quantified when reported. For example, if the terminal device performs RSRP measurement on a SRS resource and obtains that the first measurement result, i.e., the RSRP value, is −15.021 dB, the terminal device can report −15 dB to the network device, that is, the first result is −15 dB.

In another possible embodiment, the first result may be a reported value obtained by the terminal device according to the first measurement result and a mapping relationship between the measurement result and the reported value. For the network device, after receiving the reported value reported by the terminal device, the first measurement result can be determined by searching the mapping relationship table between the measurement result and the reported value.

The mapping relationship between the measurement result and the reported value can be agreed on in advance by the terminal device and the network device, or the mapping relationship can be indicated to the terminal device by the network device through high-level signaling, or the corresponding relationship can also be a predefined mapping relationship, for example, the mapping relationship is a mapping relationship specified in a standard specification.

Table 2 illustratively shows the mapping relationship between the measurement result and the reported value when the measurement quantity is RSRP. The mapping relationship shown in Table 2 describes 96 value ranges of the RSRP value, and the reported value is an integer greater than or equal to 0 and less than or equal to 95. Each of the 96 value ranges may correspond to one reported value, and the 96 value ranges may also be represented by 7-bit bits. Therefore, the terminal device reports the reported value to the network device, which can occupy 7-bit bits to report. It can be seen from Table 2 that if the RSRP value (i.e., the first measurement result) is −46dB and the reported value is 94, then the first result reported by the terminal device is 94.

TABLE 2

| Reported value | RSRP value | Unit |
| --- | --- | --- |
| Reported value 0 | RSRP < −139 | dB |
| Reported value 1 | −139 ≤ RSRP < −138 | dB |
| . . . | . . . | |
| Reported value 94 | −46 ≤ RSRP < −45 | dB |
| Reported value 95 | −45 ≤ RSRP | dB |

It should be noted that the mapping relationship shown in Table 2 is only a specific implementation of the embodiment of the present disclosure, and does not limit the embodiment of the present disclosure, and any corresponding relationship obtained by transformation on this basis falls within the scope of protection of the present disclosure.

In the embodiment of the present disclosure, in addition to reporting the first result to the network device, the terminal device may also report cell information corresponding to the first result to the network device.

The cell corresponding to the first result may be understood as: if the terminal device performs CLI measurement in cell 1 to obtain the measurement result 1 and the measurement result 2, performs CLI measurement in cell 2 to obtain the measurement result 2, the terminal device selects the measurement result 2 to report, that is, the measurement result 2 is the first result, and the cell corresponding to the first result is cell 1.

Optionally, the cell information reported by the terminal device may include, but is not limited to, at least one of the following: a frequency and a physical cell identity (PCI) of the cell, an identity of the cell, an index of the cell, and number information or index information of the cell in all measured cells.

Illustratively, the identity of the cell may be a physical layer cell ID, where the cell ID may be a cell global identifier (Cell Global Identifier, CGI). It should be understood that the CGI mentioned here may be an evolved universal terrestrial radio access network (E-UTRAN) CGI (ECGI), or, it may also be NR CGI (NCGI).

The terminal device may also report bandwidth part (BWP) information corresponding to the first result to the network device, where the BWP corresponding to the first result may be understood as: the terminal device performs CLI measurement on resource 1 to obtain the measurement result 1, and reports the measurement result 1, i.e., the first result, then the BWP corresponding to the first result is the BWP corresponding to resource 1.

In addition, the terminal device may also report resource information or resource group information corresponding to the first result to the network device, where the resource corresponding to the first result may be an SRS resource and/or a first resource used for RSSI measurement. The resource or resource group corresponding to the first result may be understood as: the terminal device performs CLI measurement on the resource or resource group to obtain the measurement result corresponding to the first result.

Optionally, the resource information or resource group information may be identifier information of the resource or identifier information of the resource group.

Figure 4:
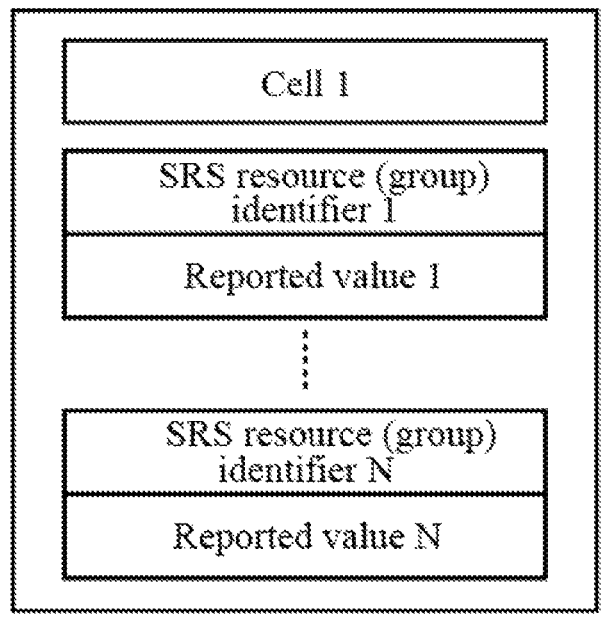
FIG. 4 is a schematic diagram of a kind of reported content of a terminal device according to an embodiment of the present disclosure.
Figure 5:
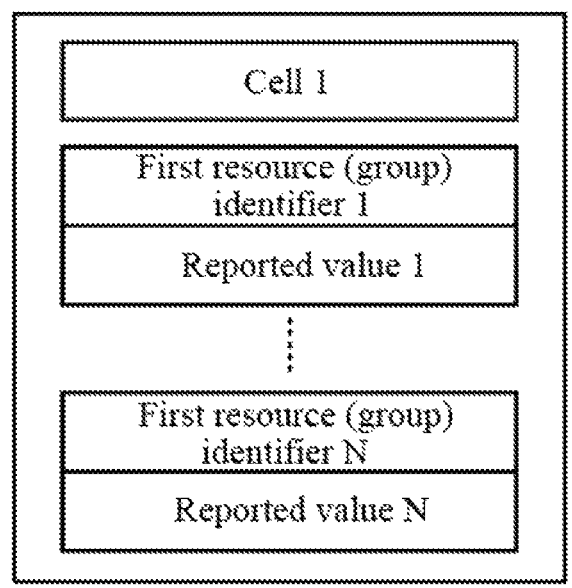
FIG. 5 is a schematic diagram of another kind of reported content of a terminal device according to an embodiment of the present disclosure.
Figure 6:
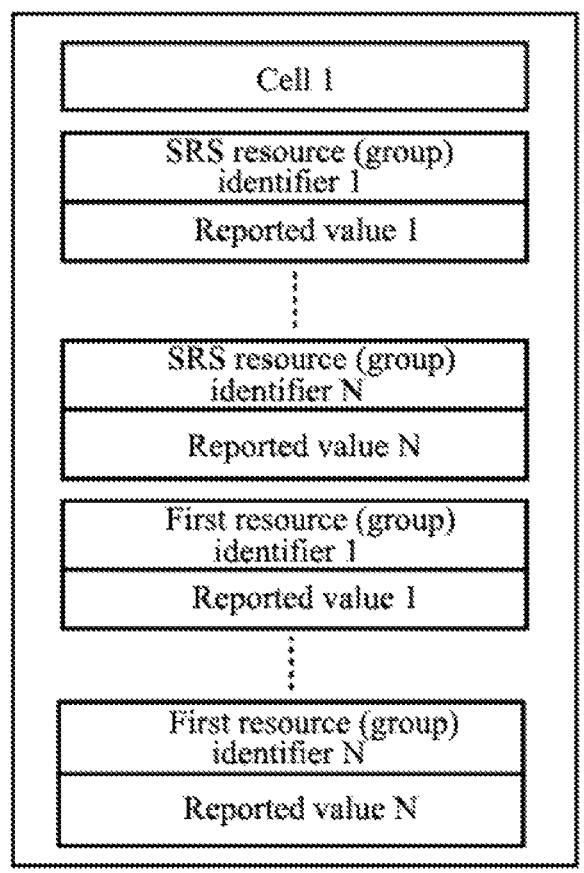
FIG. 6 is a schematic diagram of another kind of reported content of a terminal device according to an embodiment of the present disclosure.

FIGS. 4-6 show reporting corresponding to a cell. It can be seen that content reported by a terminal device to a network device in FIG. 4 includes: cell information, an SRS resource or SRS resource group identifier for CLI measurement in the cell, and a reported value corresponding to a measurement result obtained by performing CLI measurement on the SRS resource or the SRS resource group (i.e., a first result). The content reported by the terminal device to the network device in FIG. 5 includes: cell information, a first resource or first resource group identifier for performing CLI measurement in the cell, and a reported value corresponding to a measurement result obtained by performing CLI measurement on the first resource or the first resource group (i.e., the first result). The content reported by the terminal device to the network device in FIG. 6 includes: cell information, an SRS resource or SRS resource group identifier for performing CLI measurement in the cell, a reported value corresponding to a measurement result obtained by performing CLI measurement on the SRS resource or the SRS resource group, and a first resource or first resource group identifier for performing CLI measurement in the cell, and a reported value corresponding to the measurement result obtained by performing CLI measurement on the first resource or the first resource group. It can be seen from FIG. 4 to FIG. 6 that in a cell, the terminal device can perform CLI measurements on multiple resources to obtain multiple first measurement results.

Figure 7:
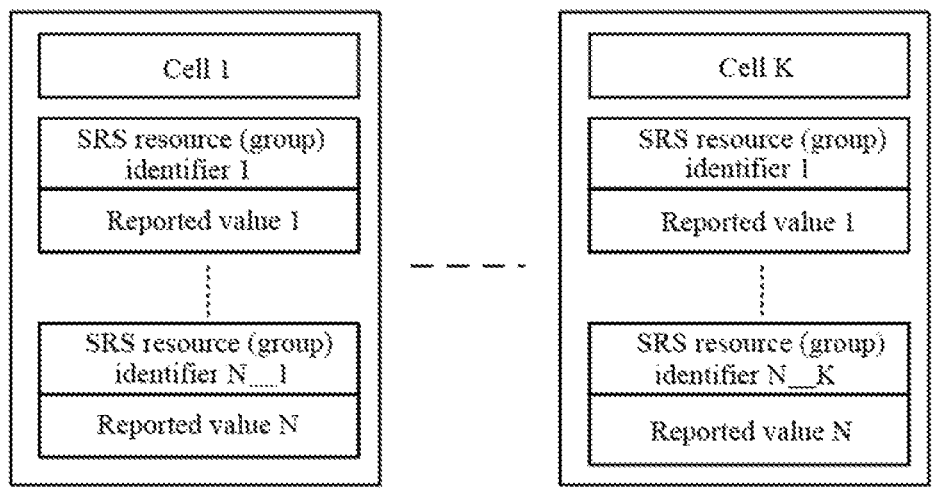
FIG. 7 is a schematic diagram of another kind of reported content of a terminal device according to an embodiment of the present disclosure.

It should be understood that the terminal device may also simultaneously report to the network device first results obtained by performing CLI measurement in multiple cells, as well as the cell information of the multiple cells, the resource or resource group information for measurement, and the BWP information corresponding to the first results, as shown in FIG. 7.

In an embodiment of the present disclosure, in addition to performing the CLI measurement to obtain the first measurement result, the terminal device may also perform mobility measurement to obtain a second measurement result, and report a second result to the network device based on the second measurement result. It should be understood that the terminal device may perform mobility measurement according to any related technology and report the second result, which is not limited in the embodiment of the present disclosure.

As an example, the reporting trigger of the first result and the reporting trigger of the second result may be independent of each other, that is, when each meets its reporting conditions and its corresponding reporting is performed. In this way, measurement and reporting for different purposes are independent of each other, so that the flexibility of the system can be maintained.

As another example, if the reporting of the first result is triggered, or the reporting of the second result is triggered, or both the reporting of the first result and the reporting of the second result are triggered, the reporting of first result and the second result may be performed simultaneously.

The first result and the second result are reported together, and the related reported content can be included in one signaling to accomplish two purposes at the same time, which can save signaling overhead.

Optionally, the first configuration information may also include a measurement identification. One measurement identification may correspond to a measurement object and a reporting configuration, that is, the measurement identification associates the measurement object with the reporting configuration. When the terminal device reports the first result, the measurement identification may also be reported to the network device, so that the network device can determine, based on the measurement identification, the measurement object which the first result reported by the terminal device is based on.

Optionally, in the embodiment of the present disclosure, one measurement identification may correspond to the first result or the second result. That is, the measurement results corresponding to a same measurement identification may not include both of the first result and the second result.

For example, as shown in the following code:

```
MeasResults ::=              SEQUENCE {
    measId                       MeasId,
    measResultServingMOList      MeasResultServMOList,
    measResultNeighCells         CHOICE {
        measResultListNR             MeasResultListNR,
        measResultListEUTRA          MeasResultListEUTRA
    }
    OPTIONAL,
}
```

The measId in the above IE is a measurement identification, measResultServingMOList is a measurement result of a current serving cell, measResultNeighCells is a measurement result of a neighboring cell, and the measurement result of the current serving cell and/or the measurement result of the neighboring cell may be expressed as the second result.

A possible IE 1 structure is as follows:

```
MeasResults ::=              SEQUENCE {
    measId                       MeasId,
    measResultServingMOList      MeasResultServMOList,    OPTIONAL
(Change to Optional)
    measResultNeighCells         CHOICE {
        measResultListNR             MeasResultListNR,
        measResultListEUTRA          MeasResultListEUTRA
    }
    OPTIONAL,
    MeasResultCL             First result reporting information OPTIONAL,
(New field, corresponding to CLI measurement result)
}
```

Or, an IE similar to MeasResult may be redesigned. Another possible IE 2 structure is as follows:

```
MeasResults2 ::=             SEQUENCE {
    measId                       MeasId,
    MeasResultCL             First result reporting information
OPTIONAL, (New field, corresponding to CLI measurement result)
}
```

The IE format is more concise for terminal device to realize.

Optionally, in the embodiment of the present disclosure, one measurement identification may correspond to the first result and the second result. That is, the measurement results corresponding to the same measurement identification may include the first result and the second result at the same time.

For example, a possible IE 3 structure is as follows:

```
MeasResults ::=              SEQUENCE {
    measId                       MeasId,
    measResultServingMOList      MeasResultServMOList,
    measResultNeighCells         CHOICE {
        measResultListNR             MeasResultListNR,
        measResultListEUTRA          MeasResultListEUTRA
    }
    OPTIONAL,
    MeasResultCL             First result reporting information,
OPTIONAL, (New field, corresponding to CLI measurement result)
}
```

It should be understood that the structure of the above IE 1 may also be applicable to the case where one measurement identification may correspond to the first result and the second result.

After receiving the first result, the network device can determine the uplink and downlink transmission method according to the first result.

For example, if the RSRP value corresponding to one or some SRS resources reported by the terminal device is large, then the network device may avoid the interference of an interference source with the large RSRP value on the terminal device through scheduling or configuration.

For another example, if the RSRP value corresponding to one or some SRS resources reported by the terminal device is small, then the network device may perform scheduling on the resource corresponding to an interference source with the small RSRP value while the performance of the current terminal device is not affected.

For another example, if the RSSI value corresponding to one or some first resources reported by the terminal device is large, the network device may avoid the interference of an interference source with a large RSSI value on the terminal device through scheduling or configuration.

For another example, if the RSSI value corresponding to one or some of the first resources reported by the terminal device is small, then the network device may perform scheduling on a resource corresponding to an interference source with the small RSSI value while the performance of the current terminal device is not affected.

In the embodiment of the present disclosure, the terminal device receives configuration information transmitted by the network device, where the configuration information includes the reporting configuration of the terminal device. After the terminal device performs interference measurement and obtains the measurement result, it can report the first result to the network device according to the reporting configuration, so that the measurement and reporting of the terminal device can be realized.

It should be understood that, in the various embodiments of the present disclosure, the size of the sequence numbers of the abovementioned processes does not mean the order of execution. The execution order of each process should be determined by its function and internal logic, and should not constitute any limitation to the implementation process of the embodiments of the present disclosure.

The communication method according to the embodiments of the present disclosure is described in detail above. A communication apparatus according to an embodiment of the present disclosure will be described below with reference to FIG. 8 to FIG. 10. The technical features described in the method embodiment are applicable to the following apparatus embodiments.

Figure 8:
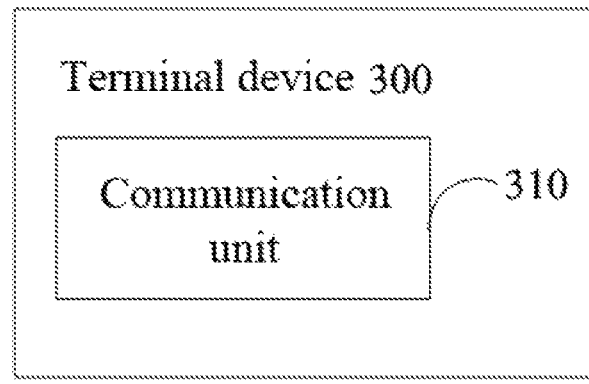
FIG. 8 is a schematic block diagram of a terminal device according to an embodiment of the present disclosure.

FIG. 8 shows a schematic block diagram of a terminal device 300 according to an embodiment of the present disclosure. As shown in FIG. 8, the terminal device 300 includes:

a communication unit 310, configured to receive configuration information transmitted by a network device, the configuration information including a reporting configuration of the terminal device 300.

The communication unit 310 is further configured to report a first result to the network device according to the reporting configuration.

Optionally, in the embodiment of the present disclosure, a configuration domain for a mobility measurement configuration is included in an IE, and the configuration domain also indicates the configuration information.

Optionally, in the embodiment of the present disclosure, a first configuration domain for a mobility measurement configuration is included in an IE, and the IE also includes a second configuration domain, and the second configuration domain indicates the configuration information.

Optionally, in the embodiment of the present disclosure, a first IE is different from a second IE, where the first IE includes a configuration domain for a mobility measurement configuration, the second IE includes a second configuration domain, and the second configuration domain indicates the configuration information.

Optionally, in the embodiment of the present disclosure, a reporting mechanism for the communication unit 310 to report the first result is periodical reporting and/or event-triggered reporting.

Optionally, in the embodiment of the present disclosure, if the reporting mechanism is the periodical reporting, the reporting configuration includes a reporting interval.

Optionally, in the embodiment of the present disclosure, if the reporting mechanism is the event-triggered reporting, the reporting configuration includes a trigger condition and a reporting interval.

Optionally, in the embodiment of the present disclosure, the trigger condition is preset on the terminal device 300, or, the trigger condition is transmitted by the network device to the terminal device 300.

Optionally, in the embodiment of the present disclosure, the terminal device 300 further includes: a processing unit 320, configured to perform measurement to obtain at least one first measurement result;

the communication unit 310 is specifically configured to report the first result to the network device according to at least one first measurement result and the reporting configuration.

Optionally, in the embodiment of the present disclosure, the communication unit 310 is specifically configured to: if the first measurement result meets the trigger condition, report the first result to the network device.

Optionally, in the embodiment of the present disclosure, the trigger condition includes a trigger threshold.

Optionally, in the embodiment of the present disclosure, if the first measurement result meets the trigger condition, the communication unit 310 is specifically configured to: report the first measurement result to the network device if any measurement result in the first measurement result meets the trigger threshold.

Optionally, in the embodiment of the present disclosure, the communication unit 310 is specifically configured to: report the first result to the network device if a number of first measurement results that meet the trigger threshold is greater than or equal to a predetermined value.

Optionally, in the embodiment of the present disclosure, the predetermined value is preset on the terminal device 300, or, the predetermined value is transmitted to the terminal device 300 by the network device.

Optionally, in the embodiment of the present disclosure, the reporting configuration further includes a number of first results reported by the communication unit 310 each time.

Optionally, in the embodiment of the present disclosure, the reporting configuration further includes a number of times the communication unit 310 reports the first result.

Optionally, in the embodiment of the present disclosure, the number of times the communication unit 310 reports the first result is a default value.

Optionally, in the embodiment of the present disclosure, the default value is one or infinity.

Optionally, in the embodiment of the present disclosure, the reporting configuration indicates a measurement quantity to be measured by the terminal device 300.

Optionally, in the embodiment of the present disclosure, the configuration information includes a measurement object configuration, and the terminal device 300 further includes: a processing unit 320, configured to determine the measurement quantity to be measured according to the measurement object configuration.

Optionally, in the embodiment of the present disclosure, information carried in the measurement object configuration indicates the measurement quantity.

Optionally, in the embodiment of the present disclosure, if the measurement object configuration includes SRS resource information, a corresponding measurement quantity is RSRP.

Optionally, in the embodiment of the present disclosure, if the measurement object configuration includes first resource information used for RSSI measurement, a corresponding measurement quantity is RSSI.

Optionally, in the embodiment of the present disclosure, if the measurement object configuration includes SRS resource information and first resource information used for RSSI measurement, the corresponding measurement quantity is RSRP and/or RSSI.

Optionally, in the embodiment of the present disclosure, if the measurement quantity is RSRP, the terminal device 300 further includes: a processing unit 320 configured to perform RSRP measurement on a SRS resource.

Optionally, in this embodiment of the present disclosure, if the measurement quantity is RSSI, the terminal device 300 further includes: a processing unit 320 configured to perform RSSI measurement on a first resource.

Optionally, in the embodiment of the present disclosure, if the measurement quantity is RSRP and RSSI, the terminal device 300 further includes: a processing unit 320 configured to perform RSRP measurement on an SRS resource and perform RSSI measurement on a first resource.

Optionally, in the embodiment of the present disclosure, the communication unit 310 is further configured to: report cell information corresponding to the first result to the network device.

Optionally, in the embodiment of the present disclosure, the communication unit 310 is further configured to: report bandwidth part BWP information corresponding to the first result to the network device.

Optionally, in the embodiment of the present disclosure, the communication unit 310 is further configured to report resource information corresponding to the first result to the network device.

Optionally, in the embodiment of the present disclosure, the terminal device 300 further includes: a processing unit 320 configured to perform mobility measurement;

the communication unit 310 is further configured to: report a second result to the network device.

Optionally, in the embodiment of the present disclosure, the reporting of the first result and the reporting of the second result are independent of each other.

Optionally, in the embodiment of the present disclosure, if the reporting of the first result and/or the reporting of the second result is triggered, the communication unit 310 is specifically configured to: report the first result and the second result to the network device simultaneously.

Optionally, in the embodiment of the present disclosure, one measurement identification corresponds to the first result or the second result.

Optionally, in the embodiment of the present disclosure, one measurement identification corresponds to the first result and the second result.

Optionally, in the embodiment of the present disclosure, the configuration information is carried in RRC signaling or a MAC CE.

Optionally, in the embodiment of the present disclosure, the measurement performed by the terminal device is cross-link interference CLI measurement.

It should be understood that the terminal device 300 may correspond to the terminal device in the method 200, and can realize the corresponding operations of the terminal device in the method 200, which will not be repeated herein for the sake of conciseness.

Figure 9:
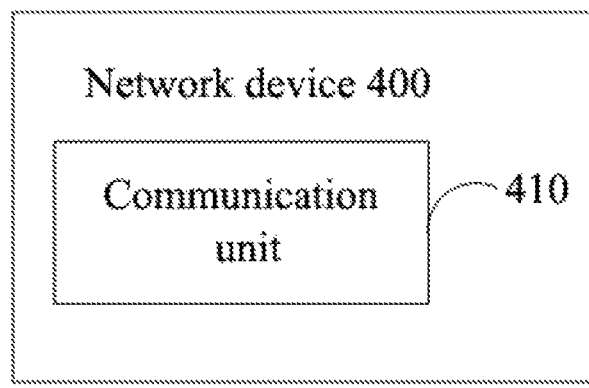
FIG. 9 is a schematic block diagram of a network device according to an embodiment of the present disclosure.

FIG. 9 shows a schematic block diagram of a network device 400 according to an embodiment of the present disclosure. As shown in FIG. 9, the network device 400 includes:

a communication unit 410, configured to transmit configuration information to a terminal device, where the configuration information includes a reporting configuration of the terminal device.

The communication unit 410 is further configured to receive a first result reported by the terminal device.

Optionally, in the embodiment of the present disclosure, a configuration domain for mobility measurement configuration is included in an IE, and the configuration domain also indicates the configuration information.

Optionally, in the embodiment of the present disclosure, a first configuration domain for a mobility measurement configuration is included in an IE, and the IE also includes a second configuration domain, and the second configuration domain indicates the configuration information.

Optionally, in the embodiment of the present disclosure, a first IE is different from a second IE, where the first IE includes a configuration domain for a mobility measurement configuration, the second IE includes a second configuration domain, and the second configuration domain indicates the configuration information.

Optionally, in the embodiment of the present disclosure, a reporting mechanism of the first result is periodical reporting and/or event-triggered reporting.

Optionally, in the embodiment of the present disclosure, if the reporting mechanism is the periodical reporting, the reporting configuration includes a reporting interval.

Optionally, in the embodiment of the present disclosure, if the reporting mechanism is event-triggered reporting, the reporting configuration includes a trigger condition and a reporting interval.

Optionally, in the embodiment of the present disclosure, the communication unit 410 is further configured to: transmit first information to the terminal device, where the first information includes the trigger condition.

Optionally, in the embodiment of the present disclosure, the trigger condition includes a trigger threshold.

Optionally, in the embodiment of the present disclosure, the communication unit 410 is further configured to: transmit second information to the terminal device, where the second information includes a predetermined value.

Optionally, in the embodiment of the present disclosure, the reporting configuration further includes a number of first results reported by the terminal device each time.

Optionally, in the embodiment of the present disclosure, the reporting configuration further includes a number of times the terminal device reports the first result.

Optionally, in the embodiment of the present disclosure, the reporting configuration indicates a measurement quantity to be measured by the terminal device.

Optionally, in the embodiment of the present disclosure, the configuration information includes a measurement object configuration, and information carried in the measurement object configuration indicates the measurement quantity to be measured by the terminal device.

Optionally, in the embodiment of the present disclosure, the configuration information includes a measurement object configuration, and the measurement object configuration includes SRS resource information, and/or, includes first resource information used for RSSI measurement.

Optionally, in the embodiment of the present disclosure, the communication unit 410 is further configured to: receive cell information corresponding to the first result reported by the terminal device.

Optionally, in the embodiment of the present disclosure, the communication unit 410 is further configured to: receive bandwidth part BWP information corresponding to the first result reported by the terminal device.

Optionally, in the embodiment of the present disclosure, the communication unit 410 is further configured to: receive resource information corresponding to the first result reported by the terminal device.

Optionally, in the embodiment of the present disclosure, the communication unit 410 is further configured to: receive a second result obtained by performing the mobility measurement reported by the terminal device.

Optionally, in the embodiment of the present disclosure, the receiving of the first result and the receiving of the second result are independent of each other.

Optionally, in the embodiment of the present disclosure, the communication unit 410 is specifically configured to: receive the first result and the second result reported by the terminal device, simultaneously.

Optionally, in the embodiment of the present disclosure, one measurement identification corresponds to the first result or the second result.

Optionally, in the embodiment of the present disclosure, one measurement identification corresponds to the first result and the second result.

Optionally, in the embodiment of the present disclosure, the configuration information is carried in RRC signaling or a MAC CE.

It should be understood that the network device 400 may correspond to the network device in the method 200, and can realize the corresponding operations of the network device in the method 200, which will not be repeated herein for the sake of conciseness.

Figure 10:
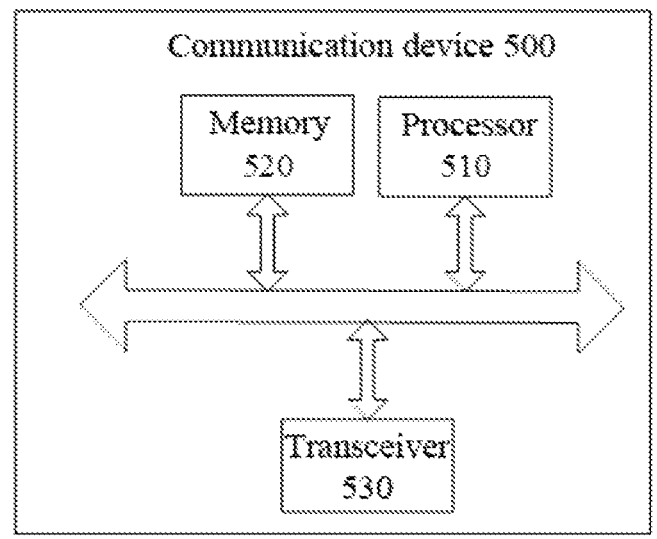
FIG. 10 is a schematic block diagram of a communication device according to an embodiment of the present disclosure.

FIG. 10 is a schematic structural diagram of a communication device 500 according to an embodiment of the present disclosure. The communication device 500 shown in FIG. 10 includes a processor 510, and the processor 510 can call and run a computer program from a memory to implement the methods in the embodiments of the present disclosure.

Optionally, as shown in FIG. 10, the communication device 500 may further include a memory 520, where the processor 510 may call and run a computer program from the memory 520 to implement the methods in the embodiments of the present disclosure.

The memory 520 may be a device separate from the processor 510, or may be integrated into the processor 510.

Optionally, as shown in FIG. 10, the communication device 500 may further include a transceiver 530, and the processor 510 may control the transceiver 530 to communicate with other devices, specifically, to transmit information or data to another device, or to receive information or data from another device.

The transceiver 530 may include a transmitter and a receiver. The transceiver 530 may further include an antenna, and the number of antennas may be one or more.

Optionally, the communication device 500 may specifically be a network device in the embodiments of the present disclosure, and the communication device 500 may implement the corresponding process implemented by the network device in each of the methods of the embodiments of the present disclosure, which will not be repeated herein for the sake of conciseness.

Optionally, the communication device 500 may specifically be a terminal device of the embodiments of the disclosure, and the communication device 500 may implement the corresponding process implemented by the terminal device in each of the methods of the embodiments of the disclosure, which will not be repeated herein for the sake of conciseness.

Figure 11:
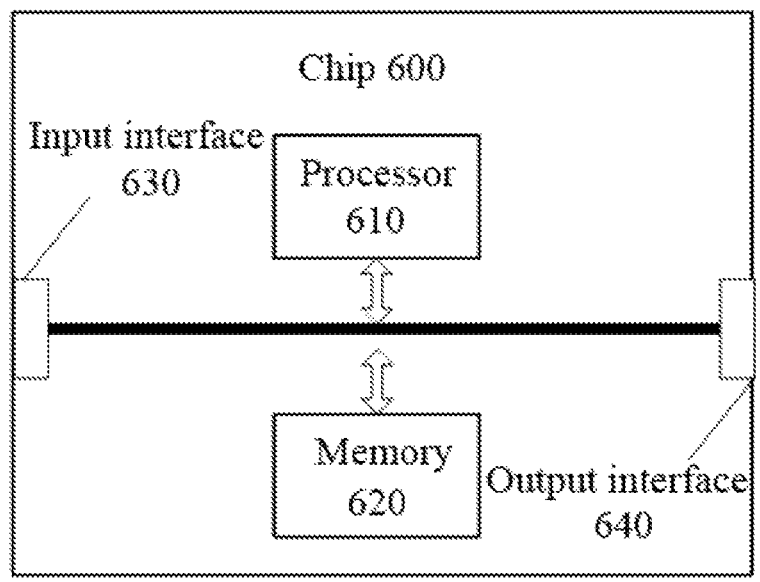
FIG. 11 is a schematic block diagram of a chip according to an embodiment of the present disclosure.

FIG. 11 is a schematic structural diagram of a chip according to an embodiment of the present disclosure. A chip 600 shown in FIG. 11 includes a processor 610, and the processor 610 may call and run a computer program from a memory to implement the methods in the embodiments of the present disclosure.

Optionally, as shown in FIG. 11, the chip 600 may further include a memory 620, where the processor 610 may call and run a computer program from the memory 620 to implement the methods in the embodiments of the present disclosure.

The memory 620 may be a device separate from the processor 610, or may be integrated into the processor 610.

Optionally, the chip 600 may further include an input interface 630, where the processor 610 may control the input interface 630 to communicate with other devices or chips, and specifically, to obtain information or data transmitted by other devices or chips.

Optionally, the chip 600 may further include an output interface 640, where the processor 610 may control the output interface 640 to communicate with other devices or chips, and specifically, to output information or data to other devices or chips.

Optionally, the chip may be applied to the terminal device in the embodiments of the present disclosure, and the chip may implement the corresponding process implemented by the terminal device in each of the methods of the embodiments of the present disclosure, which will not be repeated herein for the sake of conciseness.

Optionally, the chip may be applied to the network device in the embodiments of the present disclosure, and the chip may implement the corresponding process implemented by the network device in each of the methods of the embodiments of the present disclosure, which will not be repeated herein for the sake of conciseness.

It should be understood that the chip mentioned in the embodiment of the present disclosure may also be referred to as a system-level chip, a system chip, a chip system, or a system-on-chip, or the like.

It should be understood that the processor of the embodiment of the present disclosure may be an integrated circuit chip with signal processing capability. In the implementation process, the steps of the abovementioned method embodiments can be completed by hardware integrated logic circuits in the processor or instructions in the form of software. The abovementioned processor may be a general-purpose processor, a digital signal processor (DSP), an application specific integrated circuit (ASIC), a field programmable gate array (FPGA) or other programmable logic devices, discrete gates or transistor logic devices, discrete hardware components. Each of the methods, steps, and logical block diagrams disclosed in the embodiments of the present disclosure may be implemented or performed. The general-purpose processor may be a microprocessor, or the processor may also be any conventional processor, or the like. The steps of the method disclosed in the embodiments of the present disclosure may be directly embodied as performed and completed by a hardware decode processor, or performed by a combination of hardware and software modules in a decode processor. The software module may be located in a mature storage medium in the art, such as a random memory, a flash memory, a read-only memory, a programmable read-only memory, or an electrically erasable programmable memory, a register, or the like. The storage medium is located in a memory, and a processor reads the information in the memory and completes the steps of the abovementioned method in combination with its hardware.

It can be understood that the memory in the embodiments of the present disclosure may be a volatile memory or a non-volatile memory, or may include both volatile and non-volatile memories. Where the non-volatile memory can be a read-only memory (Read-Only Memory, ROM), a programmable read-only memory (Programmable ROM, PROM), an erasable programmable read-only memory (Erasable PROM, EPROM), and an electrically erasable programmable read-only memory (Electrically EPROM, EEPROM), or flash memory. The volatile memory may be a random access memory (Random Access Memory, RAM), which is used as an external cache. By illustratively but not restrictively described, many forms of RAM are available, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM) and a direct rambus RAM (Direct Rambus RAM, DR RAM). It should be noted that the memories of the systems and methods described herein are intended to include, but are not limited to, these and any other suitable types of memories.

It should be understood that the abovementioned memories are illustratively but not restrictively described. For example, the memory in the embodiments of the present disclosure may also be a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (SLDRAM) and a direct rambus random access memory (synch link DRAM, DR RAM), and the like. That is to say, the memories in the embodiments of the present disclosure are intended to include, but are not limited to, these and any other suitable types of memories.

Figure 12:
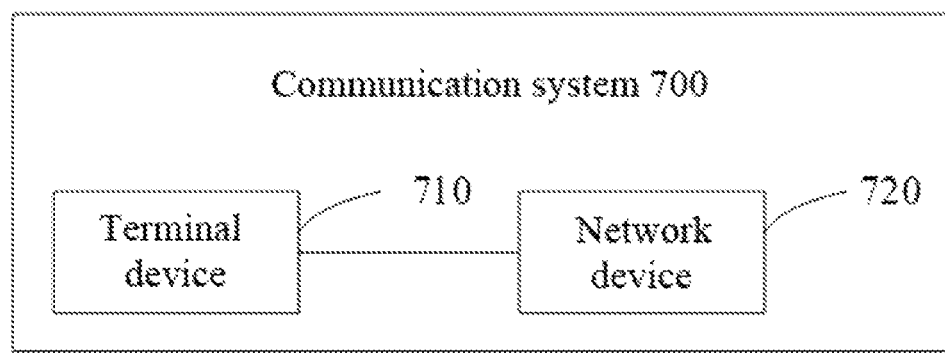
FIG. 12 is a schematic block diagram of a communication system according to an embodiment of the present disclosure.

FIG. 12 is a schematic block diagram of a communication system 700 according to an embodiment of the present disclosure. As shown in FIG. 12, the communication system 700 includes a terminal device 710 and a network device 720.

The terminal device 710 may be configured to implement the corresponding functions implemented by the terminal device in the abovementioned method, and the network device 720 may be configured to implement the corresponding functions implemented by the network device in the abovementioned method, which will not be repeated herein for the sake of conciseness.

An embodiment of the present disclosure also provides a computer readable storage medium, configured to store a computer program.

Optionally, the computer readable storage medium may be applied to the terminal device in the embodiments of the present disclosure, and the computer program enables the computer to execute the corresponding process implemented by the terminal device in each of the methods of the embodiments of the present disclosure, which will not be repeated herein for the sake of conciseness.

Optionally, the computer readable storage medium may be applied to the network device in the embodiments of the present disclosure, and the computer program enables the computer to execute the corresponding process implemented by the network device in each of the methods of the embodiments of the present disclosure, which will not be repeated herein for the sake of conciseness.

An embodiment of the present disclosure also provides a computer program product, including computer program instructions.

Optionally, the computer program product may be applied to the terminal device in the embodiments of the present disclosure, and the computer program instructions enable the computer to execute the corresponding process implemented by the terminal device in each of the methods of the embodiments of the present disclosure, which will not be repeated herein for the sake of conciseness.

Optionally, the computer program product may be applied to the network device in the embodiments of the present disclosure, and the computer program instructions enable the computer to execute the corresponding process implemented by the network device in each of the methods of the embodiments of the present disclosure, which will not be repeated herein for the sake of conciseness.

An embodiment of the present disclosure also provides a computer program.

Optionally, the computer program may be applied to the terminal device in the embodiments of the present disclosure, and when the computer program runs on a computer, enables the computer to execute the corresponding process implemented by the terminal device in each of the methods of the embodiments of the present disclosure, which will not be repeated herein for the sake of conciseness.

Optionally, the computer program may be applied to the network device in the embodiment of the present disclosure, and when the computer program runs on the computer, enables a computer to execute the corresponding process implemented by the network device in each of the methods of the embodiments of the present disclosure, which will not be repeated herein for the sake of conciseness.

A person having ordinary skill in the art understands that each of the units and algorithm steps illustratively described in combination with the embodiments disclosed herein may be implemented by electronic hardware, or a combination of computer software and electronic hardware. Whether these functions are executed by hardware or software depends on the specific disclosure and design constraints of the technical solution. Those skilled in the art may use different methods for each specific disclosure to implement the described functions, while such implementations should not be considered as going beyond the scope of the present disclosure.

Those skilled in the art can clearly understand that, for convenience and concise description, for the specific working process of the abovementioned system, device, and unit, reference can be made to the corresponding process in the foregoing method embodiments, which will not be repeated herein.

In the several embodiments provided in the present disclosure, it should be understood that the disclosed system, device, and method may be implemented in other ways. For example, the device embodiments described above are merely illustrative. For example, the division of the units is only a logical function division, and there may be other divisions in actual implementation, for example, a plurality of units or components may be combined or integrated into another system, or some features may be ignored or not executed. On the other hand, the displayed or discussed mutual coupling, direct coupling, or communicative connection may be indirect coupling or communicative connection through some interfaces, apparatuses or units, and may be in electrical, mechanical or in other forms.

The units illustrated as separating components may be or not be physically separated, and the components displayed as units may be or not be physical units, that is, may be located in one place, or may be distributed on a plurality of network units. Some or all of the units therein may be selected according to practical needs to achieve the purposes of the solutions of the embodiments.

In addition, each of the functional units in each of the embodiments of the present disclosure may be integrated into one processing unit, or each unit may be physically independent, or two or more units may be integrated into one unit.

If the functions are implemented in the form of a software functional unit and sold or used as an independent product, they can be stored in a computer readable storage medium. Based on this understanding, the technical solution of the present disclosure may be essentially or the part that contributes to the prior art or a part of the technical solution may be embodied in the form of a software product. The computer software product is stored in a storage medium, including several instructions for a computer device (which may be a personal computer, a server, or a network device, etc.) to execute all or part of the steps of the methods described in each of the embodiments of the present disclosure. The aforementioned storage medium includes: a U disk, a mobile hard disk, a read-only memory (Read-Only Memory, ROM), a random access memory (Random Access Memory, RAM), a magnetic disk or an optical disk or other kinds of media capable of storing program codes.

The abovementioned is only specific implementations of the present disclosure, but the protection scope of the present disclosure is not limited thereto. Any person skilled in the art can easily think of variations or substitutions within the technical scope disclosed in the present disclosure, which should be covered within the protection scope of the present disclosure. Therefore, the protection scope of the present disclosure shall be subject to the protection scope of the claims.

What is claimed is:

1. A wireless communication method, comprising:
   receiving, by a terminal device, configuration information transmitted by a network device, the configuration information comprising a reporting configuration of cross-link interference (CLI) measurement performed by the terminal device, the configuration information comprising a measurement object configuration;
   determining, by the terminal device, a measurement quantity to be measured according to the measurement object configuration;
   wherein
   if the measurement object configuration comprises sounding reference signal (SRS) resource information, a corresponding measurement quantity is reference signal received power (RSRP) and the method further comprises: performing, by the terminal device, RSRP measurement on an SRS resource; or
   if the measurement object configuration comprises first resource information used for received signal strength indicator (RSSI) measurement, a corresponding measurement quantity is RSSI, and the method further comprises: performing, by the terminal device, RSRP measurement on a first resource; or
   if the measurement object configuration comprises SRS resource information and first resource information used for RSSI measurement, a corresponding measurement quantity is RSRP and/or RSSI and the method further comprises: performing, by the terminal device, RSRP measurement on an SRS resource, and performing RSSI measurement on a first resource;
   wherein the method further comprises reporting, by the terminal device, a first result of the CLI measurement performed by the terminal device to the network device according to the reporting configuration;
   wherein if a reporting mechanism for the terminal device to report the first result is event-triggered reporting, the reporting configuration comprises a trigger condition and a reporting interval, and the trigger condition comprises a trigger threshold; and
   wherein the reporting, by the terminal device, a first result to the network device according to the reporting configuration, comprises:
   reporting, by the terminal device, the first result to the network device, if any measurement result in the first measurement result meets the trigger threshold.

2. The method according to claim 1, wherein a configuration domain for a mobility measurement configuration is comprised in an information element (IE), and the configuration domain further indicates the configuration information.

3. The method according to claim 1, wherein the reporting mechanism for the terminal device to report the first result further comprises periodical reporting.

4. The method according to claim 3, wherein if the reporting mechanism is the periodical reporting, the reporting configuration comprises a reporting interval.

5. The method according to claim 4, wherein the trigger condition is received by the terminal device from the network device.

6. The method according to claim 1, wherein the method further comprises:
   reporting, by the terminal device, resource information corresponding to the first result to the network device.

7. The method according to claim 1, wherein the method further comprises:
   performing, by the terminal device, mobility measurement, and reporting a second result to the network device.

8. The method according to claim 7, wherein if each of the first result and the second result meets its reporting conditions, each of the first result and the second result performs its corresponding reporting.

9. The method according to claim 7, wherein
   one measurement identification corresponds to the first result or the second result; or,
   one measurement identification corresponds to the first result and the second result.

10. The method according to claim 1, wherein the configuration information is carried in radio resource control (RRC) signaling or in a media access control (MAC) control element (CE).

11. A wireless communication method, comprising:
    transmitting, by a network device, configuration information to a terminal device, the configuration information comprising a reporting configuration of the terminal device, the configuration information comprising a measurement object configuration;
    wherein
    if the measurement object configuration comprises sounding reference signal (SRS) resource information, a corresponding measurement quantity is reference signal received power (RSRP) and the method further comprises: performing, by the terminal device, RSRP measurement on an SRS resource; or if the measurement object configuration comprises first resource information used for received signal strength indicator (RSSI) measurement, a corresponding measurement quantity is RSSI, and the method further comprises: performing, by the terminal device, RSRP measurement on a first resource; or if the measurement object configuration comprises SRS resource information and first resource information used for RSSI measurement, a corresponding measurement quantity is RSRP and/or RSSI and the method further comprises: performing, by the terminal device, RSRP measurement on an SRS resource, and performing RSSI measurement on a first resource;

wherein a measurement quantity is determined by the terminal device according to the measurement object configuration;

wherein the method further comprises receiving, by the network device, a first result reported by the terminal device; and wherein if a reporting mechanism of the first result is event-triggered reporting, the reporting configuration comprises a trigger condition and a reporting interval, and the trigger condition comprises a trigger threshold; and wherein the receiving by the network device, a first result reported by the terminal device, comprises:

receiving, by the network device, the first result reported by the terminal device when any measurement result in the first measurement result meets the trigger threshold.

12. A terminal device, comprising:
a processor, a memory and a transceiver,
wherein the memory is configured to store a computer program, and the processor, when executing the program, is configured to control the transceiver to:

receive configuration information transmitted by a network device, the configuration information comprising a reporting configuration of cross-link interference (CLI) measurement performed by the terminal device, the configuration information comprising a measurement object configuration;

wherein the processor is further configured to determine a measurement quantity to be measured according to the measurement object configuration;

wherein if the measurement object configuration comprises sounding reference signal (SRS) resource information, a corresponding measurement quantity is reference signal received power (RSRP) and the method further comprises: performing, by the terminal device, RSRP measurement on an SRS resource; or if the measurement object configuration comprises first resource information used for received signal strength indicator (RSSI) measurement, a corresponding measurement quantity is RSSI, and the method further comprises: performing, by the terminal device, RSRP measurement on a first resource; or if the measurement object configuration comprises SRS resource information and first resource information used for RSSI measurement, a corresponding measurement quantity is RSRP and/or RSSI, and the method further comprises: performing, by the terminal device, RSRP measurement on an SRS resource, and performing RSSI measurement on a first resource;

wherein the transceiver is further configured to report a first result of the CLI measurement performed by the terminal device to the network device according to the reporting configuration;

wherein if a reporting mechanism for reporting the first result is event-triggered reporting, the reporting configuration comprises a trigger condition and a reporting interval and the trigger condition comprises a trigger threshold; and wherein the transceiver is further configured to:
report the first result to the network device if any measurement result in the first measurement result meets the trigger threshold.

13. The terminal device according to claim 12, wherein the reporting configuration further comprises a number of first results reported by the transceiver each time.

14. The terminal device according to claim 12, wherein the reporting configuration further comprises a number of times the transceiver reports the first result.

15. The terminal device according to claim 12, wherein the reporting configuration indicates a measurement quantity to be measured by the terminal device.

16. A network device, comprising:
a processor, a memory and a transceiver,
wherein the memory is configured to store a computer program, and the processor, when executing the program, is configured to control the transceiver to:

transmit configuration information to a terminal device, the configuration information comprising a reporting configuration of cross-link interference (CLI) measurement performed by the terminal device, the configuration information comprising a measurement object configuration;

wherein if the measurement object configuration comprises sounding reference signal (SRS) resource information, a corresponding measurement quantity is reference signal received power (RSRP) and the method further comprises: performing by the terminal device, RSRP measurement on an SRS resource; or if the measurement object configuration comprises first resource information used for received signal strength indicator (RSSI) measurement, a corresponding measurement quantity is RSSI, and the method further comprises: performing, by the terminal device, RSRP measurement on a first resource; or if the measurement object configuration comprises SRS resource information and first resource information used for RSSI measurement a corresponding measurement quantity is RSRP and/or RSSI, and the method further comprises: performing, by the terminal device, RSRP measurement on an SRS resource, and performing RSSI measurement on a first resource;

wherein a measurement quantity is determined by the terminal device according to the measurement object configuration;

wherein the transceiver is further configured to receive a first result of the CLI measurement performed by the terminal device reported by the terminal device;

wherein if a reporting mechanism of the first result is event-triggered reporting the reporting configuration comprises a trigger condition and a reporting interval, and the trigger condition comprises a trigger threshold;

wherein the transceiver is further configured to receive the first result reported by the terminal device when any measurement result in the first measurement result meets the trigger threshold.

* * * * *